UNITED STATES PATENT OFFICE.

HERMAN LORÉTAN, OF BASEL, SWITZERLAND, ASSIGNOR TO THE FIRM OF DYE WORKS, FORMERLY L. DURAND, HUGUENIN & CO., OF BASEL, SWITZERLAND.

LEUCO DERIVATIVES OF GALLOCYANINS AND AROMATIC AMINS AND PROCESS OF MAKING SAME.

No. 844,155.     Specification of Letters Patent.     Patented Feb. 12, 1907.

Application filed October 19, 1906. Serial No. 339,673. (Specimens.)

*To all whom it may concern:*

Be it known that I, HERMAN LORÉTAN, chemist, a citizen of the Swiss Republic, and resident of Basel, Switzerland, have invented new Leuco Derivatives of the Gallocyanins and the Aromatic Diamins and a Process for the Manufacture of Same, of which the following is a clear, full, and exact specification.

I have found that the slight solubility of the new dyestuffs derived from the gallocyanins and the aromatic diamins according to my application for Letters Patent executed at the same time as the present one renders it difficult to apply them in printing, but that their leuco derivatives, which are easily obtained by the action of various chemical reducing agents or by electrolysis, do not present this difficulty. Their leuco derivatives are all, in the form of their salts—hydrochlorids, for example—much more easily soluble than the dyestuffs from which they are derived and may be fixed under better conditions by printing. These leuco derivatives are stable in the form of salts, but are oxidized rapidly in air when in the free state or in presence of alkalies. They dissolve in sulfuric acid to a pale brownish-red solution, which turns dark red on addition of a small quantity of an oxidant, such as manganese dioxid.

Example I: Into a vat provided with a mechanical stirrer are introduced fifty kilos of one of the products obtained from a gallocyanin and an aromatic diamin, according to the above-mentioned application for Letters Patent, suspended in one thousand liters of water, thirty kilos of hydrochloric acid of 20° Baumé specific gravity are added, the mass is heated to 50° centigrade, and there are then added, in alternate small doses during some hours, fifty kilos of hydrochloric acid and twenty kilos of zinc powder. When the dyestuff is completely dissolved, the mass is heated to 70° centigrade, filtered, allowed to cool, and mixed with salt to precipitate the leuco derivative. The filtered and dried product is a greenish-gray powder, showing the reactions indicated above.

Example II: Into an autoclave having a double bottom five hundred liters of water, fifty kilos of one of the products made by condensing a gallocyanin and an aromatic diamin, according to the examples of the above-mentioned application for Letters Patent, and sixty kilos of crystallized sodium sulfid, are introduced. The autoclave is closed and the mass heated for one hour at 90° centigrade. The contents of the autoclave are poured into a vat having a chimney and containing fifty liters of water and seventy to seventy-five kilos of hydrochloric acid of 20° Baumé. Fifty kilos of salt are added and the whole allowed to cool. The product is filtered and dissolved in six hundred liters of hot water, the solution filtered, and the leuco derivative precipitated by adding salt.

Example III: To reduce the dyestuff by electrolysis, fifty kilos of one of the products made by condensing a gallocyanin and an aromatic amin, according to the examples of the above-mentioned application for Letters Patent, are suspended in six hundred liters of water and thirty kilos of hydrochloric acid of 21° Baumé. The anode-compartment is separated by a diaphragm and contains dilute hydrochloric acid. The anode is of carbon, the cathode of platinum or lead. The reduction is carried out while well stirring mechanically at a temperature of 50° to 70° centigrade, the current density being one to two amperes per square decimeter. The reduction is finished when the dyestuff is completely dissolved and the solution has a green color. The product is then precipitated by adding common salt filtered and dried.

What I claim is—

1. The described process for the manufacture of leuco derivatives of the dyestuffs derived from the gallocyanins and the aromatic diamins, which consists in subjecting the said dyestuffs to a reducing action.

2. As new products, the described leuco derivatives of the dyestuffs derived from the gallocyanins and the aromatic diamins, being in dry state greenish-gray powders, stable in the form of their salts, which are much more easily soluble and may be fixed under better conditions by printing, than the dyestuffs from which they are derived, oxidizing rapidly in air when in the free state or in presence of alkalies, dissolving in sulfuric acid to a pale brownish-red solution, which turns dark red on addition of a small quantity of an oxidant.

In witness whereof I have hereunto signed my name this 3d day of October, 1906, in the presence of two subscribing witnesses.

HERMAN LORÉTAN.

Witnesses:
    GEO. GIFFORD,
    AMAND RITTER.